US006600872B1

United States Patent
Yamamoto (10) Patent No.: US 6,600,872 B1
(45) Date of Patent: Jul. 29, 2003

(54) TIME LAPSE RECORDING APPARATUS HAVING ABNORMAL DETECTING FUNCTION

(75) Inventor: Naoto Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/336,587

(22) Filed: Jun. 21, 1999

(30) Foreign Application Priority Data

Jun. 19, 1998 (JP) .......................................... 10-173180

(51) Int. Cl.⁷ ................................................. H04N 5/91
(52) U.S. Cl. ......................................... 386/67; 386/111
(58) Field of Search .......................... 386/46, 111, 117, 386/67, 93, 68, 112; 360/5; 348/154

(56) References Cited

U.S. PATENT DOCUMENTS

| 4,001,881 A | * | 1/1977 | Folsom ....................... 386/117 |
| 5,301,032 A | * | 4/1994 | Hong et al. .................. 382/250 |
| 5,799,129 A | * | 8/1998 | Muto .......................... 386/111 |

FOREIGN PATENT DOCUMENTS

| JP | 8-69597 | 3/1996 |
| JP | 8-79703 | 3/1996 |
| JP | 8-98136 | 4/1996 |
| JP | 8-98140 | 4/1996 |
| JP | 11-18076 | 1/1999 |
| JP | 411018076 A | * 1/1999 |

* cited by examiner

Primary Examiner—Huy Nguyen
(74) Attorney, Agent, or Firm—Young & Thompson (57) ABSTRACT

A picture processing apparatus of moving picture coding type having a motion correcting circuit is disclosed. An abnormality detecting means 5 compares the unit time mean coding bit number of past frame and the coding bit number of the present frame and executes abnormality detection on the basis of the difference between the compared coding bit numbers. A recording interval control means 8 controls the number of frames outputted to a recording means such that the unit time recording frame interval is reduced in the abnormality detection state. A code quantity control means 6 controls the picture quality and/or the quantity of codes generated per frame correspondence to the complexity of input picture.

21 Claims, 6 Drawing Sheets

TIME LAPSE RECORDING APPARATUS HAVING ABNORMAL DETECTING FUNCTION

BACKGROUND OF THE INVENTION

The present invention relates to recording apparatuses for intermittently recording picture data of a monitor camera or the like at a constant interval and, more particularly, to time lapse recorders, which comprise a motion correcting circuit, typically MPEG2 ("Generic coding of moving pictures and associated audio information: video", ISO/IEC IS 13818-2), provided in a picture coding part and an HDD (hard disc drive) or a VCR (Video Cassette Recorder) provided in a recording unit part.

Time lapse VCRs (video tape recorders) using VTRs are well known in the art as an apparatus for intermittently recording an extracted part of a picture signal from a camera at a constant interval.

With the recent development of digital signal processing techniques, time lapse recorders are also used, in which image signal is digitized and data compressed by using a still image coding system, typically JPEG ("Digital Compression Coding of Continuous-Tone Still Images", ISO/IEC IS 10918-1) for recording of the compressed data in a recording medium, such as HDD or an optical disc.

The time lapse recorder currently in practical use, has a problem that in the case of an analog VTR it is difficult to record high quality picture signal.

In the digital system case, it is possible to obtain high quality picture signal recording owing to the use of a still picture cording system. However, for executing abnormality detection and automatically reducing the picture signal recording interval when the abnormality is detected, an exclusive abnormality detector is necessary, so that the apparatus is increased in scale, complicated and increased in cost.

SUMMARY OF THE INVENTION

The present invention was made in view of the above problem, and it has an object of providing a time lapse recorder, which uses a motion picture coding system having a motion compensating circuit typically MPEG2 and thus can detect abnormality without exclusive abnormality detector, and in which when the abnormality is detected the recording interval is adaptively changed or the recording picture quality is improved to permit accurate recording of the abnormal phenomenon.

According to an aspect of the present invention, there is provided a time lapse recorder comprising: a dividing means for dividing an input picture signal into signals corresponding to small area blocks each consisting of a plurality of pixels; a motion estimate means for retrieving motion vectors of blocks most similar to each other in picture frames of different times; a motion compensating means for obtaining a difference between a coding subject frame and a motion vector computation frame for each of the blocks on the basis of the motion vectors; an orthogonal transform means for executing orthogonal transform of the blocks; a quantizing means for quantizing transform coefficient values as the output of the orthogonal transform means; a code quantity control means for controlling picture quality and quantity of codes generated per frame in accordance with the complexity of the input picture; a variable length coding means for variable length coding quantized coefficient data outputted from the quantizing means; an abnormality detecting means for detecting abnormality of input picture; a recording interval control means for changing recording frame number at a constant interval in the normal state and in unit times in the abnormality detection state; and a recording means for recording the variable length coded data in a recording medium under control of the recording interval control means, wherein the abnormality detecting means computes the coding bit number of the variable length coding means for each frame, compares the difference of this coding bit number from the coding bit number of the immediately preceding frame having the same predicted structure and executes abnormal detection when the compared difference is above a predetermined threshold value.

According to another aspect of the present invention, there is provided a time lapse recorder comprising: a dividing means for dividing an input picture signal into signals corresponding to small area blocks each consisting of a plurality of pixels; a motion estimate means for retrieving motion vectors of blocks most similar to each other in picture frames of different times; a motion compensating means for obtaining a difference between a coding subject frame and a motion vector computation frame for each of the blocks on the basis of the motion vectors; an orthogonal transform means for executing orthogonal transform of the blocks; a quantizing means for quantizing transform coefficient values as the output of the orthogonal transform means; a code quantity control means for controlling picture quality and quantity of codes generated per frame in accordance with the complexity of the input picture; a variable length coding means for variable length coding quantized coefficient data outputted from the quantizing means; an abnormality detecting means for detecting abnormality of input picture; a recording interval control means for changing recording frame number at a constant interval in the normal state and in unit times in the abnormality detection state; and a recording means for recording the variable length coded data in a recording medium under control of the recording interval control means, wherein the abnormality detecting means computes statistical value of the distribution or amplitude values of the motion vectors for each frame, compares the statistical value of the motion vectors with a predetermined threshold value, and executes abnormality detection when the statistical value is above the threshold value.

The recording interval control means adaptively controls the recording frame number according to a multiple-valued output of the abnormality detecting means. When the output of the abnormality detecting means is abnormal, the recording interval control means controls the recording frame number such as to permit recording of all frames. The abnormality detecting means provides a multiple-valued output, and the recording interval control means decodes the value of the output of the abnormality detecting means, selects a recording time interval corresponding to the output value among a plurality of different recording times shorter than a recording time in a normal state and causes the recording means to record frames at the selected recording time interval. The code quantity control means executes code quantity control on the basis of the output of the abnormality detecting means such as to provide an improved recording picture quality when the abnormality is detected.

According to other aspect of the present invention, there is provided in an image processing apparatus of moving picture coding type for detecting motion vectors from an input picture, variable length coding a motion corrected signal, and recording the coded signal in recording means, a time lapse recorder comprising: means for comparing a unit time mean coding bit number of past frames and the coding bit number of the present frame and executing abnormality detection on the basis of the difference between the compared coding bit numbers; and means for controlling the number of frames recorded in the recording means such that the recording interval per unit time is reduced when the abnormality is detected.

According to still other aspect of the present invention, there is provided inn an image recording apparatus for detecting motion vectors from an input picture, generating an inter-frame difference value between the input picture and a predicted frame from the motion vectors, executing orthogonal transform of the inter-frame difference, quantizing coefficients obtained by the orthogonal transformation, coding the quantized coefficients and recording the quantized coefficients in a recording means, a time lapse recorder comprising: an abnormality detecting mean for comparing a unit time mean coding bit number of past frames and the coding bit number of the present frame and executing abnormality detection on the basis of the difference between the compared coding bit numbers; and a recording interval control means for controlling the number of frames recorded in the recording means such that the recording interval per unit time is reduced when the abnormality is detected.

According to further aspect of the present invention, there is provided in an image recording apparatus for detecting motion vectors from an input picture, generating an inter-frame difference value between the input picture and a predicted frame from the motion vectors, executing orthogonal transform of the inter-frame difference, quantizing coefficients obtained by the orthogonal transformation, coding the quantized coefficients and recording the quantized coefficients in a recording means, a time lapse recorder comprising: an abnormality detecting means including means for computing the unit time least mean coding bit number on the basis of the frame coding bit number of each frame, and means for comparing the coding bit number of the present frame and the least mean coding bit number and determines that the frame is abnormal when the difference is greater than a predetermined threshold value; and a recording interval control means for controlling the number of frames recorded in the recording means such that the recording interval per unit time is reduced when the abnormality is detected.

According to still further aspect of the present invention, there is provided in an image recording apparatus for detecting motion vectors from an input picture, generating an inter-frame difference value between the input picture and a predicted frame from the motion vectors, executing orthogonal transform of the inter-frame difference, quantizing coefficients obtained by the orthogonal transformation, coding the quantized coefficients and recording the quantized coefficients in a recording means, a time lapse recorder comprising: an abnormality detecting means including means for computing the unit time least mean coding bit number on the basis of the frame coding bit number of each frame, and means for comparing the coding bit number of the present frame and the least mean coding bit number and determines that the frame is abnormal when the difference is greater than a predetermined threshold value; and a recording interval control means for controlling the number of frames recorded in the recording means such that the recording interval per unit time is reduced when the abnormality is detected, wherein a plurality of threshold values are provided, and abnormality detection is executed by a multiple-valued state detection as a result of comparison between the difference and the plurality of threshold values.

The abnormality detecting means includes: means for selecting a frame having a predetermined predicted structure among input frames; means for receiving frame coding bit number of the selected frame and computing the unit time least mean coding bit number; and means for executing abnormality detection and providing an abnormality detection signal when the quotient of division of the mean coding bit number by the least mean coding bit number is greater than a predetermined threshold value and also when the quotient of division of the coding bit number of the selected present input frame by the unit time least mean coding bit number is greater than a predetermined threshold value. The frame coding bit number is inputted when P picture frames alone or P and B picture frames are inputted. The abnormality detecting means includes: means for analyzing the motion vector over one frame; and means for comparing the motion vector value distribution with a predetermined value, executing abnormality detection when it is larger than the predetermined value, and generating an abnormal detection signal. The abnormality detecting means includes: means for converting the motion vector amplitudes to corresponding scalar values; means for accumulating the scalar values for each frame; and means for comparing the accumulation value with a predetermined threshold value and outputting an abnormality detection signal when the accumulation value is greater than the threshold value. The recording interval control means normally executes a control for recording frames at a predetermined recording time interval in the recording means; and when the abnormality detecting means detects abnormality, the variable length coding means is controlled on the basis of the value of the output of the abnormality detecting means such that all frames are recorded continuously or at a recording time interval shorter than the recording time interval in the normal state. An abnormal detection signal is outputted when it is determined from a motion vector value and coordinate data of a base block of the motion vector that motion coordinates of the motion vector are in a predetermined monitoring area. When the abnormality detecting means detects abnormality, the code quantity control means controls the quantizing means and the variable length coding means for recording frames in the recording means at an increased coding rate and a reduced compression factor compared to the normal state.

Other objects and features will be clarified from the following description with reference to attached drawings.

PREFERRED EMBODIMENTS OF THE INVENTION

Preferred embodiments of the present invention will now be described with reference to the drawings.

In one preferred embodiment, the time lapse recorder according to the present invention comprises a coding bit number counting means for accumulating frame coding bit numbers for a plurality of frames, an abnormality judging means for obtaining a difference coding bit number of a past frame and coding bit number of the present frame and detecting the occurrence of abnormality when the difference is greater or less than a predetermined threshold value, and a recording interval control means for controlling the number of frames outputted to a recording means such that the recording interval per unit time is reduced when the abnormality is detected.

With this embodiment of the present invention, it is possible to make analysis of the status of transition with time lapse of the frame coding bit number in the picture coding apparatus and permit abnormality detection by comparing the mean coding bit number in a constant past time and coding bit number of the frame as the subject of coding.

In a second preferred embodiment, the time lapse recorder according to the present invention comprises a motion vector distribution analyzing means for analyzing motion vector data outputted from a motion estimate means for one frame, an abnormality detecting means for comparing a motion vector value distribution state and a predetermined threshold value and detecting the occurrence of abnormality when the distribution state is greater than the threshold value, and a recording interval control means for controlling the number of picture frames outputted to a recording means such that the recording interval per unit time is reduced when the abnormality is detected.

With this embodiment of the present invention, by analyzing motion vectors in the image coding apparatus it is possible to find invasion of the third party or detect abnormality from motion vector detection in a monitoring area.

In a third preferred embodiment, the time lapse recorder according to the present invention comprises a recording interval control means for comparing a two-valued or multiple-valued output of the abnormality detecting means and outputting only coded data of a particular frame for adaptively varying the unit time recording frame number according to the magnitude of the abnormality detecting means output.

With this embodiment of the present invention, normally it is possible to extend the recording time per recording medium by reducing the unit time recording frame number, and when the abnormality is detected it is possible to permit more accurate recording of detected abnormality circumstances by adaptively varying the unit time recording frame number.

In a fourth preferred embodiment the time lapse recorder according to the present invention comprises a code quantity control means for comparing the two-valued or multiple-valued output of the abnormality detecting means and a plurality of different threshold values and, in the abnormality detection state, improving the recording picture quality by increasing the frame coding bit number compared to the coding bit number in the normal state.

With this embodiment of the present invention, normally it is possible to extend the recording time per recording medium by suppressing the frame coding bit number, while in the abnormality detection state it is possible to permit reconstituted picture of improved quality to be obtained by increasing the frame coding bit number.

Figure 1:
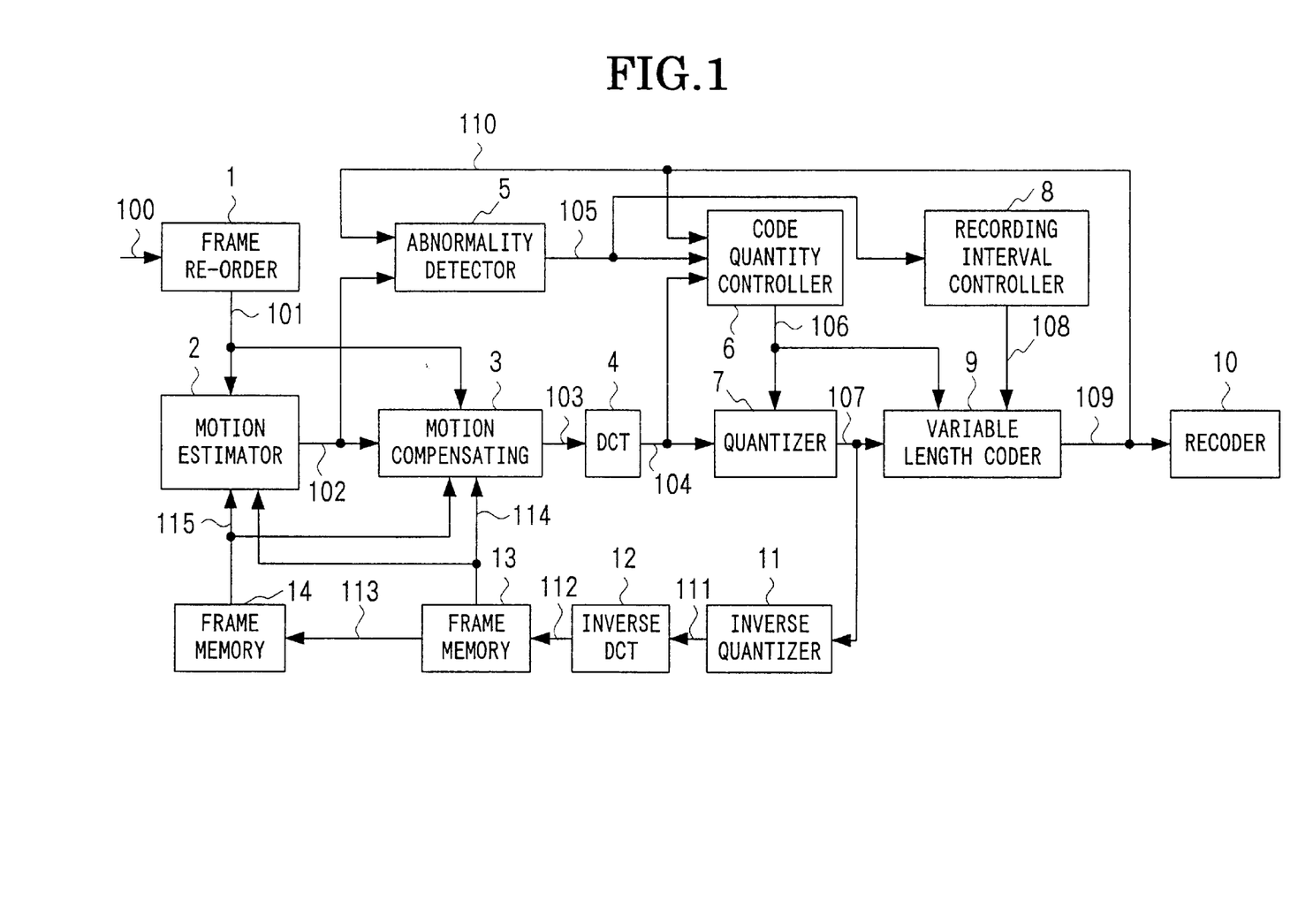
FIG. 1 is a block diagram showing an embodiment of the time lapse recorder according to the present invention.

FIG. 1 is a block diagram showing an embodiment of the time lapse recorder according to the present invention. Referring to FIG. 1, the embodiment of the present invention comprises a frame re-order circuit 1, a motion estimate circuit (motion estimator) 2, a motion compensating circuit 3, a DCT (Discrete Cosine Transform) circuit 4, an abnormality detecting circuit (abnormality detector) 5, a code quantity control circuit(code quantity controller) 6, a quantizing circuit 7, an inverse quantizing circuit 11, an inverse DCT circuit 12, frame memories 13 and 14, a variable length coding circuit (variable length coder) 9, a recording interval control circuit (recording interval controller) 8 and a recorder 10.

Input picture data 100, which is digital picture data, is constituted by multiple-value monochromatic data, RGB original color data, luminance data and two color difference data. The frame re-order circuit 1 re-orders or rearrange the input picture data.

Figure 2:
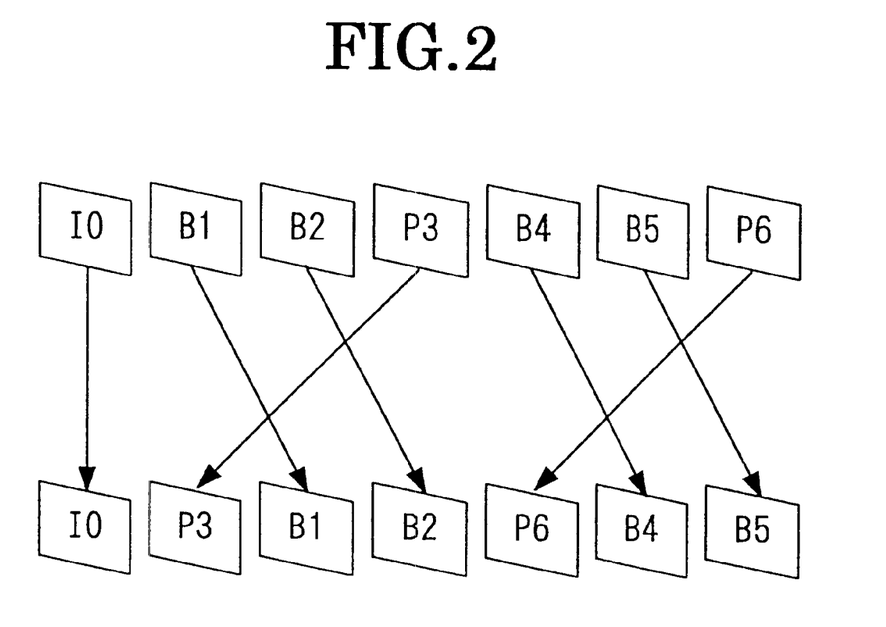
FIG. 2 shows how the input picture data 100 is usually re-orderd in MPEG2.

FIG. 2 shows how the input picture data 100 is usually re-orderd in MPEG2. As shown, when I0 (I picture), B1 (B picture), B2 (B picture), P3 (P picture), B4 (B picture), B5 (B picture) and P6 (P picture) data are inputted as the 0-th to 6-th picture data in the mentioned sequence, the frame re-order circuit 1 re-orders these data to a sequence of I0, P3, B1, B2, P6, B4 and B5 data as the 0-th 6-th picture data, and output macroblock data 101 for each macroblock to the motion estimate circuit 2 and the motion compensating circuit 3.

The motion estimate circuit 2 estimates, that is, retrieves for the least predicted error motion vector of the macroblock data 101 by using predicted macroblock data 114 or 115 read out from the frame memory 13 or 14, and outputs the retrieved frame memory data and motion vector as motion vector data 102 to the motion compensating circuit 3 and the abnormality detecting circuit 5.

For I picture data, the motion compensating circuit 3 outputs the macroblock data 101 to the DCT circuit 4. For P or B picture, it obtains the difference between the macroblock data 101 and predicted macroblock data 114 or 115 read out according to the motion vector data 102, and outputs the difference as macroblock data 103.

The DCT circuit 4 executes DCT (discrete cosine transform) on the difference macoblock data 103, and outputs DCT coefficient data 104 to the code quantity control circuit 6 and the quantizing circuit 7 through executing zig-zag scan transform or the like such that continuous non-zero coefficient values will be obtained when variable length coding is made. The DCT is usually executed with a block size of 8×8, but it is also possible to use other orthogonal transform means or block sizes.

The abnormality detecting circuit 5 executes abnormality detection by using the motion vector value 102 as the output of the motion estimate circuit 2 or cumulative encoding bit number data 110 of the variable length coding circuit 9, and outputs abnormality detection data 105 to the code quantity control circuit 6 and the recording interval control circuit 8.

The code quantity control circuit 6 computes a quantizing step data 106 for controlling the quantizing width by using the AC component accumulation value of the transform coefficient value block or macroblock, or per-frame coding bit number data 111 as the output of the variable length coding circuit 9 such as to obtain desired picture quality or coding bit number, and outputs the data 106 to the quantizing circuit 7.

The quantizing circuit 7 qantizes the quantizing step data 106 computed in the code quantity control circuit 6 and transform coefficient data 104 by using a quantizing matrix for providing different weights for different frequencies, and outputs quantized transform coefficient data 107 to the variable length coding circuit 9 and the inverse quantizing circuit 11.

When the abnormality detecting circuit 5 detects no abnormality detection data 105, through the recording interval control circuit 8 the variable length coding circuit 9 outputs variable length coding word data 109 consisting of sole I pictures spaced apart at a predetermined interval. When the abnormality is detected, the recording interval control circuit 8 outputs frame thinning-down control data 108 to the variable length coding circuit 9 according to the abnormality detection data 105 such that the output interval for variable length coding word data 109 is adaptively changed such as to be, for instance, 5 seconds, one second, for the sole I frames, for the sole I/P frames and for all the frames.

The variable length coding circuit 9 converts the quantized transform coefficient data 107 to corresponding variable length coding word data by utilizing such entropy codes as run length codes or Huffman codes, selects frames to be outputted according to the frame thinning-down control data 108 of the recording interval control circuit 8, and outputs only the coding words of the selected frames as the variable length coding words 109 to the recorder 10. The variable length coding circuit 9 also outputs the per-frame accumulated coding bit number data 110 to the abnormality detecting circuit 5 and the code quantity control circuit 6. It is assumed that the per-frame accumulated coding bit number data 10 has been initialized to zero before the start of the frame.

The recorder 10 has a recording medium such as a memory, a HDD, a magnetic tape, an optical disc or the like, and records the variable length coding words 110 outputted from the variable code length coding circuit 9 in the medium.

With an I or P picture frame structure, the inverse quantizing circuit 11 executes inverse quantization by using quantizing step value data 106, quantized transform coefficient data 107 and a quantizing matrix which is the same as the quantizing circuit 7, and outputs inversely quantized coefficient data 111 to the inverse DCT circuit 12.

The inverse DCT circuit 12 executes the inverse zig-zag transform of the inversely quantized coefficient data 111 to reconstitute the block data, and executes inverse DCT of the block data to output reconstituted picture data 112 to the frame memory 13.

The frame memories 13 and 14 stores reconstituted picture data of the I or P picture frame structure, and are used by the motion estimate circuit 2 and the motion compensating circuit 3. In the case where no internal prediction is made, the frame memory 14 can be dispensed with.

Figure 3:
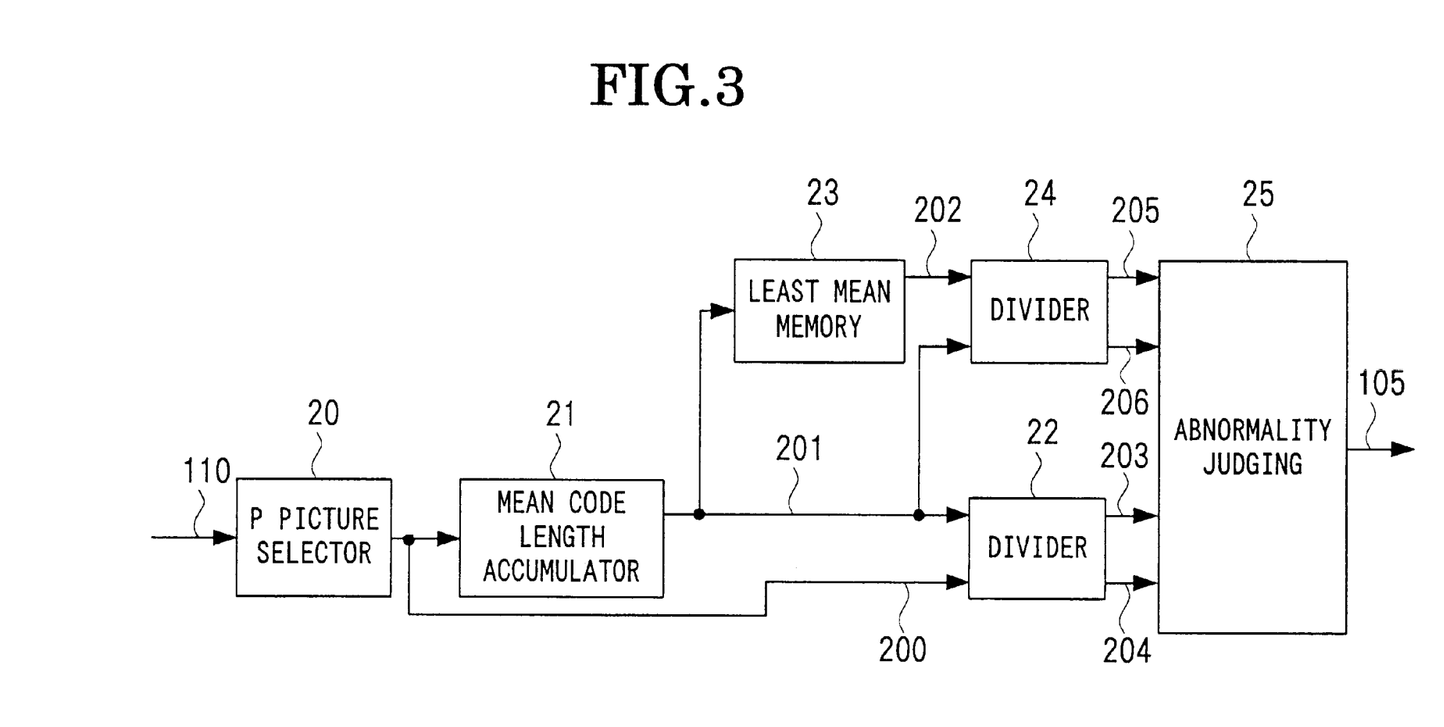
FIG. 3 is a block diagram showing an example of the abnormality detecting circuit 5 in the embodiment of the present invention.

FIG. 3 is a block diagram showing an exemplified abnormality detecting circuit 5 in the embodiment. Referring to Figure, the abnormality detecting circuit 5 includes a P picture selecting circuit 20, a mean code length accumulator 21, dividing circuits 22 and 24, a least mean memory 23 and an abnormality judging circuit 25.

When the input frame is a P picture frame, the P picture selecting circuit 20 outputs per-frame coding bit number data 200 to the mean code length accumulator 21.

The mean code length accumulator 21 computes unit time mean coding bit number data 201, and outputs this data to the dividing circuit 22 and the least mean memory 23. The dividing circuit 22 executes division with coding bit number 200 of the input frame as dividend and the mean coding bit number 201 as the divisor, and outputs the quotient result 203 to the abnormality judging circuit 25. The least mean memory 23 stores the minimum data of the mean coding bit number or the least mean coding bit number, and outputs least mean coding bit number data 202 to the dividing circuit 24. The dividing circuit 24 executes division with the mean coding bit number 201 as the dividend and the least mean coding bit number 202 as the divisor, and outputs the quotient result 205 to the abnormality judging circuit 27. The abnormality judging circuit 25 compares the quotient result 203 with a predetermined threshold value 204, or compares the quotient result 205 with a threshold value 206. When the quotient result 203 is greater than the threshold value 204 or when the quotient result 205 is greater than the threshold value 206, it judges that an abnormality has occurred, and outputs abnormality detecting data 105 to the code quantity control circuit 6 and the recording interval control circuit 8. The abnormality detecting data 105 once outputted holds a detecting state until the next unit time mean value is obtained.

The quotient result 205 is used for the abnormality judgment for preventing misjudgment, with the sole comparison of the mean coding bit number and the input frame coding bit number, the abnormality detection state to be normal state when the abnormal state is continued for long time.

Aside from the above conditions, it is possible to permit multiple value detection by using a plurality of threshold values 204 or permit abnormality judgment by using the absolute value of the input frame coding bit number and the threshold value.

In the case of a picture signal through a camera for monitoring an area where there is no operator, normally it can not be thought that the image characteristics of each frame are changed greatly. Instead, it can be thought that a still picture is continued. It is well known in the art in a moving picture coding apparatus having a motion compensating circuit, for P and B pictures in the still picture state a high compression efficiency is achievable because of a high correlation in time, and they can be coded with a very small coding bit number compared to I picture which is coded by intra-frame coding.

This property is utilized in the abnormality detecting circuit, which computes the coding bit number 110 of the variable length coding circuit 9 for each frame, compares the difference of the coding bit number 110 from the coding bit number of the immediately preceding frame having the same predicted structure, and executes abnormality detection when the difference is above a predetermined threshold value. When the coding bit number of the predicted picture is small, the circuit judges the picture to be a still picture, and when the coding bit number is large, it judges the picture to be a moving picture.

It is thus possible to increase the accuracy of the abnormality detection by permitting analysis in greater details with incorporation of B picture in addition to P picture.

Figure 4:
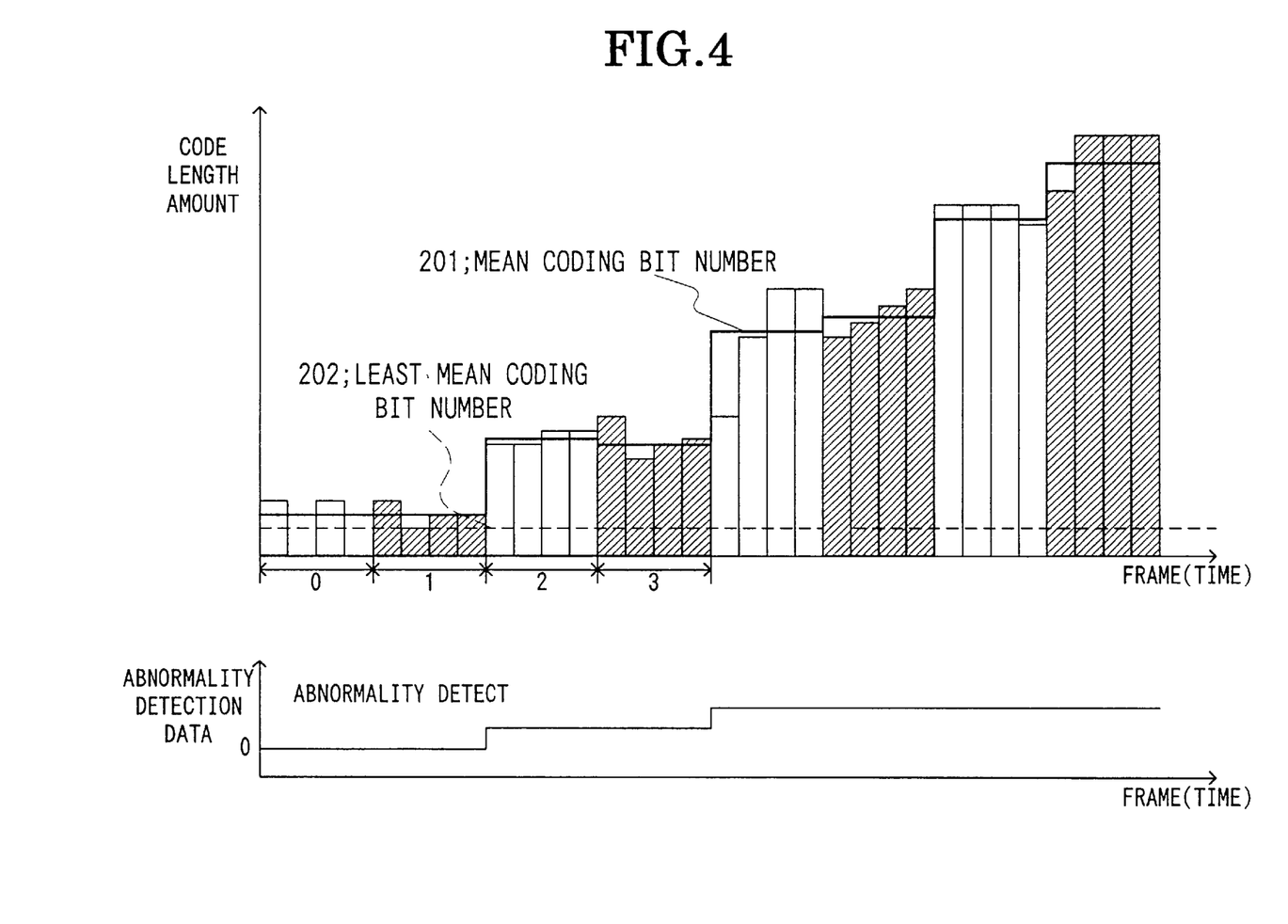
FIG. 4 is a view for describing the manner of control when abnormality detection is executed by using the frame coding bit number 110 for each frame time.

FIG. 4 is a view for describing the manner of control when abnormality detection is executed by using the frame coding bit number 110 for each frame time. In this case, two different threshold values are used for permitting the abnormality detection in two abnormality detection stages. In the Figure, the unit time of averaging is set to four P picture frames, and the coding bit number of each P picture frame and also the mean coding bit number 201 and the least mean coding bit number 202 shown in FIG. 3 are plotted.

The coding bit number of the 8-th frame is about three times the mean coding bit number 201 of the 4-th to 7-th frames, and the quotient result 203 is greater than the predetermined threshold value 204. Thus, the abnormal state can be detected. The coding bit number 200 of the 12-th to 15-th frames is substantially the same as the mean coding bit number 201 of the 8-th to 11-th frames, but is about four times the least mean coding bit number 202. Thus, it is possible to hold the state of the immediately preceding frame and output the abnormality detection data 105.

As has been shown, the abnormality detecting circuit 5 detects abnormality by using the result of coding of a particular frame by the variable length coding circuit 9. Thus, no large scale additional circuit is necessary even in the case of the maximum code quantity, and it is possible to realize the same functions as the circuit by using a CPU (Central Processing Unit) or a DSP (Digital Signal Processor) for system control mounted in the apparatus.

Figure 5:
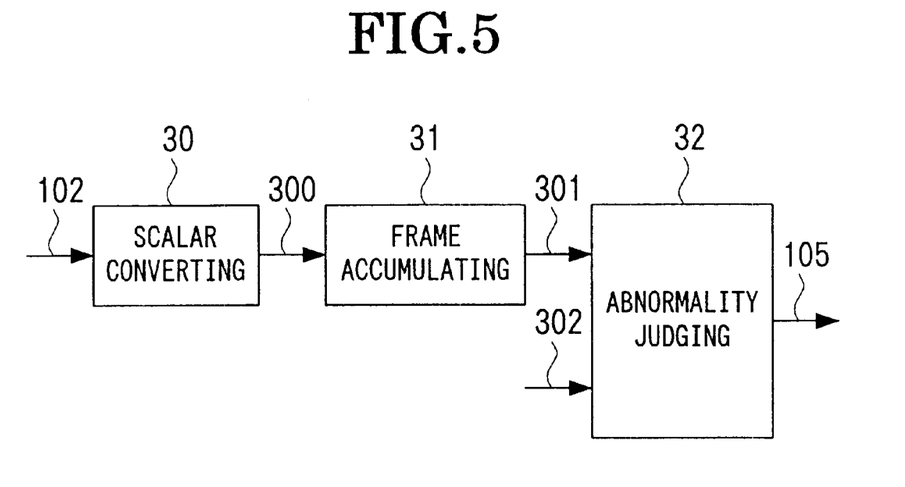
FIG. 5 is a block diagram showing a second embodiment of the abnormality detecting circuit 5 according to the present invention.

FIG. 5 is a block diagram showing a second embodiment of the abnormality detecting circuit 5 according to the present invention. Referring to the Figure, the abnormality detecting circuit 5 comprises a scalar converting circuit 30, a frame accumulating circuit 31 and an abnormality judging circuit 32.

The scalar converting circuit 30 generates a scalar value representing the amplitude of the motion vector 102, and outputs this scalar value 300 to the frame accumulating circuit 31. The frame accumulating circuit 31 computes the accumulation of scalar values for each frame, and outputs frame accumulation value 301 to the abnormality judging circuit 32. The abnormality judging circuit 32 compares the frame accumulation value 301 with a predetermined threshold value 302. When the 10 frame accumulation value 301 is greater than the threshold value 302, the circuit 32 judges the pertinent frame to be abnormal, and outputs the abnormality detection data 105 to the code quantity control circuit 6 and the recording interval control circuit 8.

Figure 6:
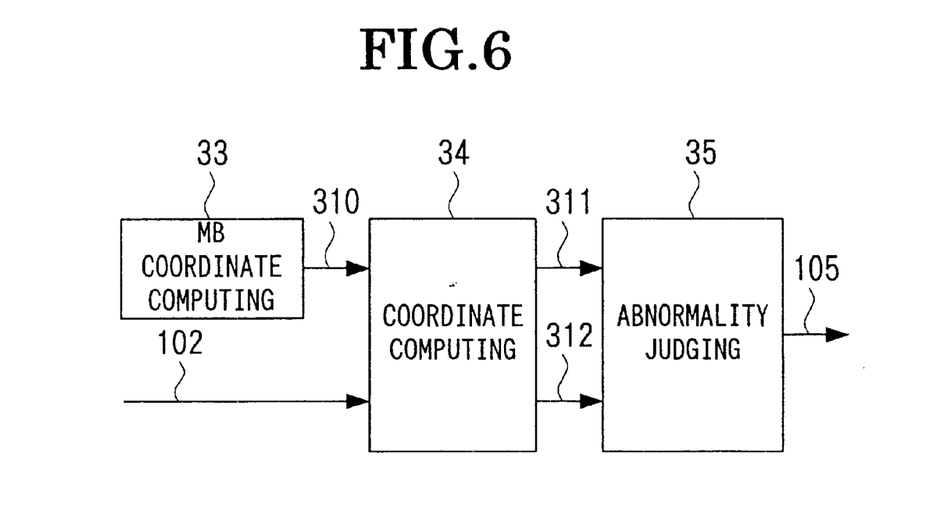
FIG. 6 is a block diagram showing the construction of the abnormality detecting circuit which uses motion vector data 102 when setting a monitoring area.

FIG. 6 is a block diagram showing the construction of the abnormality detecting circuit which uses motion vector data 102 when setting a monitoring area. Referring to the Figure, the circuit includes an MB (macroblock) coordinate computing circuit 33, a coordinate computing circuit 34 and an abnormality judging circuit 35.

The MB coordinate computing circuit 33 computes vector base macroblock coordinates from the pertinent macroblock number of the present motion vector data 102 and outputs them to the coordinate computing circuit 34. The coordinate computing circuit 34 executes computation with the motion vector data 102 and the macroblock coordinates 310, and outputs motion vector coordinate data 311 to the abnormality judging circuit 35.

The abnormality judging circuit 35 executes a check as to whether one or more sets of motion vector motion coordinates 311 is or are in a predetermined monitoring area 312. When the checked coordinates are in the monitoring area, the abnormality detecting circuit 35 executes abnormality detection, and outputs the abnormality detection data 105 to the code quantity control circuit 5 and the recording interval control circuit 8.

Figure 7:
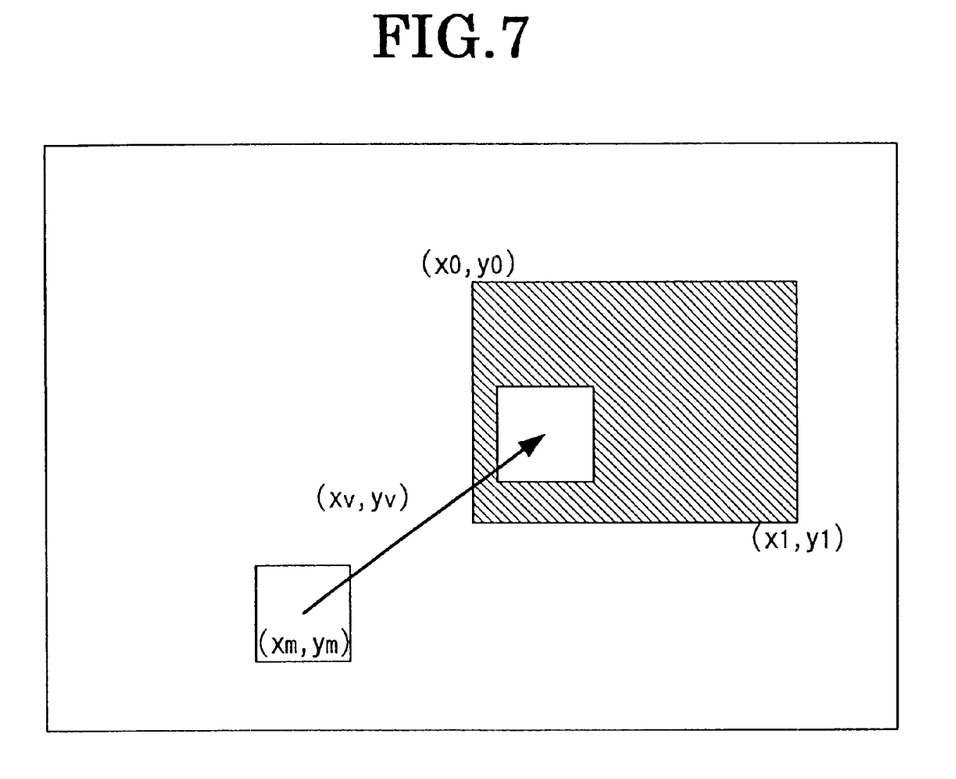
FIG. 7 is a view illustrating an example of operation of the abnormality detecting circuit 5 shown in FIG. 6.

FIG. 7 is a view illustrating an example of operation of the abnormality detecting circuit 5 shown in FIG. 6. The input motion vector data is represented by (xv, vv), the macroblock number is represented by m, and the monitoring area is a rectangular area having a left upper corner (x0, y0) and a right lower corner (x1, y1). It is assumed that conditions that x0<1 and y0<y1 are met.

An MB coordinate computing circuit 33 computes the vector base macroblock coordinates (xm, ym) from the macroblock number, and outputs these coordinates (xm, ym) to a coordinates converting circuit 34. The coordinates converting circuit 34 adds the macroblock coordinate data (xm, ym) and the motion vector data (xv, yv), and outputs the sum coordinates (xm+xv, ym+yv) to the abnormality detecting circuit 35. The abnormality detecting circuit 35 makes a check as to whether the coordinates (xm+xv, ym+yv) are in a range given by (x0, y0) and (x1, y1), i.e., whether conditions (x0$\leq$xm+xv<x1) and (y0$\leq$ym+yb<y1) are met, and when the checked coordinates are in this area, it outputs the abnormality detection data 105.

In the case of using a monitoring area having a shape other than a rectangular shape, the same effects are obtainable although the method of the check is different. When a monitoring area is set, it is possible to use the frame accumulation of the motion vector values noted above as well.

By using the system using the per-frame coding bit number and the system using the motion vector distribution in combination for the abnormality detection, it is possible to make an overall judgment from various circumstances, and the accuracy of the abnormality detection can be improved although the circuit scale is increased.

Referring to FIG. 1 again, the construction of the recording interval control circuit 8 will now be described. When the abnormality detection data 105 represents the normal state, the recording interval control circuit 8 outputs interframe thinning-down control data 108 to the variable length coding circuit 9 such that variable length code word data 109 of I picture is outputted to the recorder 10 at a predetermined interval, for example, at an interval of one frame per minute. When the abnormality detection data 105 is two-valued and represents the abnormality detection state, the recording interval control circuit 8 outputs the frame thinning-down control data 108 such that all the frames are recorded.

When the abnormality detection data 105 is multiple-valued, the recording interval control circuit 8 decodes this data, and controls the recording interval according to the state values. For example, when the data has four different states, the frame thinning-down control data 108 is outputted to the variable length coding circuit 9 such that the recording is executed at an interval of one minutes in state 0 (normal state), at an interval of 15 seconds in state 1, at an interval of one second in state 2, and for all the frames in state 3. In this mode, normally the recording medium can be effectively utilized to permit recording for long time. In the abnormality detection state, the recording frame interval is reduced according to the circumstances, so that it is possible to record the circumstances accurately.

The construction of the code quantity control circuit 6 will now be described. The code quantity control circuit 5 computes quantizing step data 106 such that the coding is executed at 4 Mbps (megabits per second) in the normal state and at 10 Mbps in the abnormal state, and outputted the computed result to the quantizing circuit 7 and the recording interval control circuit 8. It will be seen that the picture quality can be improved by increasing the coding rate and reducing the compression factor in the abnormality detection state, so that it is possible to accurately record abnormal circumstances.

It is also possible to obtain picture quality according to the respective circumstances by making the abnormality detection data 105 to be multiple-valued and varying the desired code quantity according to the respective states.

As has been described in the foregoing, according to the present invention the following effects are obtainable.

Abnormality detection is executed from the unit time mean coding bit number and the input frame bit number, and in the abnormality detection state automatic change from intermittent recording to continuous recording can be made to permit faithful recording of abnormality circumstances.

Motion vector amplitude values of a frame obtained in the motion estimate means are accumulated, abnormality detection is executed when the accumulation value is above a threshold value, and in the abnormality detection state automatic change from intermittent recording to continuous recording can be made to permit faithful recording of abnormality circumstances.

By adaptively varying the unit time recording frame number by using abnormality detecting data according to the first or second invention, normally the time of recording in the same recording medium can be extended, while in the abnormality detection state it is possible to obtain moving picture recording such as to permit accurately grasping abnormality circumstances.

By varying the picture compression factor by using abnormality detection data according to the first or second invention, normally the time of recording in the same recording medium can be extended, while in the abnormality recording such as to permit accurately grasping abnormality circumstances.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A time lapse recorder comprising:
   a dividing means for dividing an input picture signal into signals corresponding to small area blocks each consisting of a plurality of pixels;
   a motion estimate means for retrieving motion vectors of blocks most similar to each other in picture frames of different times;
   a motion compensating means for obtaining a difference between a coding subject frame and a motion vector computation frame for each of the blocks on the basis of the motion vectors;
   an orthogonal transform means for executing orthogonal transform of the blocks;
   a quantizing means for quantizing transform coefficient values as the output of the orthogonal transform means;
   a code quality control means for controlling picture quality and quantity of codes generated per frame in accordance with the complexity of the input picture;
   a variable length coding means for variable length coding quantized coefficient data outputted from the quantizing means;
   an abnormality detecting means for detecting abnormality of input picture;
   a recording interval control means for changing recording frame number at a constant interval in the normal state and in unit times in the abnormality detection state; and
   a recording means for recording the variable length coded data in a recording medium under control of the recording interval control means,
   wherein the abnormality detecting means computes the coding bit number of the variable length coding means for each frame, compares the difference of this coding bit number from the coding bit number of the immediately preceding frame having the same predicted structure and executes abnormal detection when the compared difference is above a predetermined threshold value, and
   wherein the recording interval control means adaptively controls the recording frame number according to a multiple-valued output of the abnormality detecting means.

2. A time lapse recorder comprising:
   a dividing means for dividing an input picture signal into signals corresponding to small area blocks each consisting of a plurality of pixels;
   a motion estimate means for retrieving motion vectors of blocks most similar to each other in picture frames of different times;
   a motion compensating means for obtaining a difference between a coding subject frame and a motion vector computation frame for each of the blocks on the basis of the motion vectors;
   an orthogonal transform means for executing orthogonal transform of the blocks;
   a quantizing means for quantizing transform coefficient values as the output of the orthogonal transform means;
   a code quantity control means for controlling picture quality and quantity of codes generated per frame in accordance with the complexity of the input picture;
   a variable length coding means for variable length coding quantized coefficient data outputted from the quantizing means;
   an abnormality detecting means for detecting abnormality of input picture;
   a recording interval control means for changing recording frame number at a constant interval in the normal state and in unit times in the abnormality detection state; and
   a recording means for recording the variable length coded data in a recording medium under control of the recording interval control means,
   wherein the abnormality detecting means computes statistical value of the distribution or amplitude values of the motion vectors for each frame, compares the statistical value of the motion vectors with a predetermined threshold value, and executes abnormality detection when the statistical value is above the threshold value.

3. The time lapse recorder according to claim 1, wherein when the output of the abnormality detecting means is abnormal, the recording interval control means controls the recording frame number.

4. A time lapse recorder comprising:
   a dividing means for dividing an input picture signal into signals corresponding to small area blocks each consisting of a plurality of pixels;
   a motion estimate means for retrieving motion vectors of blocks most similar to each other in picture frames of different times;
   a motion compensating means for obtaining a difference between a coding subject frame and a motion vector computation frame for each of the blocks on the basis of the motion vectors;
   an orthogonal transform means for executing orthogonal transform of the blocks;
   a quantizing means for quantizing transform coefficient values as the output of the orthogonal transform means;
   a code quality control means for controlling picture quality and quantity of codes generated per frame in accordance with the complexity of the input picture;

a variable length coding means for variable length coding quantized coefficient data outputted from the quantizing means;

an abnormality detecting means for detecting abnormality of input picture;

a recording interval control means for changing recording frame number at a constant interval in the normal state and in unit times in the abnormality detection state; and a recording means for recording the variable length coded data in a recording medium under control of the recording interval control means, wherein the abnormality detecting means computes the coding bit number of the variable length coding means for each frame, compares the difference of this coding bit number from the coding bit number of the immediately preceding frame having the same predicted structure and executes abnormal detection when the compared difference is above a predetermined threshold value, wherein the abnormality detecting means provides a multiple-valued output, and the recording interval control means decodes the value of the output of the abnormality detecting means, selects a recording time interval corresponding to the output value among a plurality of different recording times shorter than a recording time in a normal state and causes the recording means to record frames at the selected recording time interval.

5. The time lapse recorder according to claim 1, wherein the code quantity control means executes code quantity control on the basis of the output of the abnormality detecting means such as to provide an improved recording picture quality when the abnormality is detected.

6. In an image processing apparatus of moving picture coding type for detecting motion vectors from an input picture, variable length coding a motion corrected signal, and recording the coded signal in recording means, a time lapse recorder comprising:

means for comparing a unit time mean coding bit number of past frames and the coding bit number of the present frame and executing abnormality detection on the basis of the difference between the compared coding bit numbers; and means for controlling the number of frames recorded in the recording means such that the recording interval per unit time is reduced when the abnormality is detected.

7. In an image recording apparatus for detecting motion vectors from an input picture, generating an inter-frame difference value between the input picture and a predicted frame from the motion vectors, executing orthogonal transform of the inter-frame difference, quantizing coefficients obtained by the orthogonal transformation, coding the quantized coefficients and recording the quantized coefficients in a recording means, a time lapse recorder comprising:

an abnormality detecting mean for comparing a unit time mean coding bit number of past frames and the coding bit number of the present frame and executing abnormality detection on the basis of the difference between the compared coding bit numbers; and a recording interval control means for controlling the number of frames recorded in the recording means such that the recording interval per unit time is reduced when the abnormality is detected.

8. In an image recording apparatus for detecting motion vectors from an input picture, generating an inter-frame difference value between the input picture and a predicted frame from the motion vectors, executing orthogonal transform of the inter-frame difference, quantizing coefficients obtained by the orthogonal transformation, coding the quantized coefficients and recording the quantized coefficients in a recording means, a time lapse recorder comprising:

an abnormality detecting means including means for computing the unit time least mean coding bit number on the basis of the frame coding bit number of each frame, and means for comparing the coding bit number of the present frame and the least mean coding bit number and determines that the frame is abnormal when the difference is greater than a predetermined threshold value; and a recording interval control means for controlling the number of frames recorded in the recording means such that the recording interval per unit time is reduced when the abnormality is detected.

9. In an image recording apparatus for detecting motion vectors from an input picture, generating an inter-frame difference value between the input picture and a predicted frame from the motion vectors, executing orthogonal transform of the inter-frame difference, quantizing coefficients obtained by the orthogonal transformation, coding the quantized coefficients and recording the quantized coefficients in a recording means, a time lapse recorder comprising:

an abnormality detecting means including means for computing the unit time least mean coding bit number on the basis of the frame coding bit number of each frame, and means for comparing the coding bit number of the present frame and the least mean coding bit number and determines that the frame is abnormal when the difference is greater than a predetermined threshold value; and a recording interval control means for controlling the number of frames recorded in the recording means such that the recording interval per unit time is reduced when the abnormality is detected, wherein a plurality of threshold values are provided, and abnormality detection is executed by a multiple-valued state detection as a result of comparison between the difference and the plurality of threshold values.

10. The time lapse recorder according to claim 7, wherein the abnormality detecting means includes:

means for selecting a frame having a predetermined predicted structure among input frames;

means for receiving frame coding bit number of the selected frame and computing the unit time least mean coding bit number; and means for executing abnormality detection and providing an abnormality detection signal when the quotient of division of the mean coding bit number by the least mean coding bit number is greater than a predetermined threshold value and also when the quotient of division of the coding bit number of the selected present input frame by the unit time least mean coding bit number is greater than a predetermined threshold value.

11. The time lapse recorder according to claim 9, wherein the frame coding bit number is inputted when P picture frames alone or P and B picture frames are inputted.

12. The time lapse recorder according to claim 7, wherein the abnormality detecting means includes:

means for analyzing the motion vector over one frame; and means for comparing the motion vector value distribution with a predetermined value, executing abnormality detection when it is larger than the predetermined value, and generating an abnormal detection signal.

13. The time lapse recorder according to claim 7, wherein the abnormality detecting means includes:
- means for converting the motion vector amplitudes to corresponding scalar values;
- means for accumulating the scalar values for each frame; and
- means for comparing the accumulation value with a predetermined threshold value and outputting an abnormality detection signal when the accumulation value is greater than the threshold value.

14. The time lapse recorder according to claim 7, wherein:
- the recording interval control means normally executes a control for recording frames at a predetermined recording time interval in the recording means; and
- when the abnormality detecting means detects abnormality, the variable length coding means is controlled on the basis of the value of the output of the abnormality detecting means such that all frames are recorded continuously or at a recording time interval shorter than the recording time interval in the normal state.

15. The time lapse recorder according to claim 7, wherein an abnormal detection signal is outputted when it is determined from a motion vector value and coordinate data of a base block of the motion vector that motion coordinates of the motion vector are in a predetermined monitoring area.

16. The time lapse recorder according to claim 9, wherein when the abnormality detecting means detects abnormality, the code quantity control means controls the quantizing means and the variable length coding means for recording frames in the recording means at an increased coding rate and a reduced compression factor compared to the normal state.

17. The time lapse recorder according to claim 2, wherein the recording interval control means adaptively controls the recording frame number according to a multiple-valued output of the abnormality detecting means.

18. The time lapse recorder according to claim 2, wherein when the output of the abnormality detecting means is abnormal, the recording interval control means controls the recording frame number such as to permit recording of all frames.

19. The time lapse recorder according to claim 2, wherein the abnormality detecting means provides a multiple-valued output, and the recording interval control means decodes the value of the output of the abnormality detecting means, selects a recording time interval corresponding to the output value among a plurality of different recording times shorter than a recording time in a normal state and causes the recording means to record frames at the selected recording time interval.

20. The time lapse recorder according to claim 2, wherein the code quantity control means executes code quantity control on the basis of the output of the abnormality detecting means such as to provide an improved recording picture quality when the abnormality is detected.

21. The time lapse recorder according to claim 1, wherein when the output of the abnormality detecting means is abnormal, the recording interval control means controls the recording frame number to permit recording of all frames.

* * * * *